United States Patent [19]

Niles

[11] Patent Number: 4,648,514

[45] Date of Patent: Mar. 10, 1987

[54] HANGING HOLDER FOR TAPE CASSETTE

[75] Inventor: Gerald J. Niles, St. Paul, Minn.

[73] Assignee: Minnesota Mining and Manufacturing Company, St. Paul, Minn.

[21] Appl. No.: 746,397

[22] Filed: Jun. 19, 1985

[51] Int. Cl.[4] ............................................. A47G 19/08
[52] U.S. Cl. ..................................... 211/41; 211/113
[58] Field of Search ..................... 211/41, 40, 94, 113, 211/71, 162, 94; 312/246, 13, 14; 206/387, 806

[56] References Cited

U.S. PATENT DOCUMENTS

| | | | |
|---|---|---|---|
| 3,272,325 | 9/1966 | Schoenmakers | 206/387 |
| 3,396,840 | 8/1968 | Farren | 206/387 X |
| 3,425,568 | 2/1964 | Albright | 211/94 X |
| 3,452,878 | 7/1969 | Smith | 211/41 |
| 3,495,716 | 2/1970 | Gregory | 206/387 X |
| 3,746,180 | 7/1973 | Spiroch et al. | 211/41 X |
| 3,897,885 | 8/1975 | Joyce | 206/387 X |
| 3,909,088 | 9/1975 | Dennehey | 211/41 X |
| 3,977,523 | 8/1976 | Cousino | 211/41 X |
| 4,155,459 | 5/1979 | Marschak | 211/94 X |
| 4,177,896 | 12/1979 | Weavers et al. | 206/387 |
| 4,194,636 | 3/1980 | Byram et al. | 211/71 |
| 4,327,952 | 5/1982 | Cournoyer et al. | 206/387 X |
| 4,333,568 | 6/1982 | Weldin | 211/113 X |
| 4,368,934 | 1/1983 | Somers | 312/246 X |
| 4,401,222 | 8/1983 | Kulikowski et al. | 211/94 |

FOREIGN PATENT DOCUMENTS

| | | | |
|---|---|---|---|
| 623231 | 10/1962 | Belgium | 211/193 |
| 2433570 | 1/1976 | Fed. Rep. of Germany | 206/387 |

Primary Examiner—Ramon S. Britts
Assistant Examiner—Sarah A. Lechok Eley
Attorney, Agent, or Firm—Donald M. Sell; James A. Smith; David W. Anderson

[57] ABSTRACT

A hanging holder is provided which supports a videocassette with respect to a support channel and a vertical surface mounting the support channel. The holder is a closed sleeve into which the videocassette is inserted and includes a hook which engages the support channel. The holder may also be provided with a flexible lower surface to facilitate removal of the videocassette, a spring-biased detent for retaining the videocassette within the holder, an inwardly-extending projection which mates with a recess in the videocassette to control the insertion orientation of the videocassette into the holder and a locking rib extending adjacent the hook to contact the support wall or the support bracket and maintain the hanging holder at a predetermined angle with respect to the vertical surface upon which the support channel is mounted.

9 Claims, 7 Drawing Figures

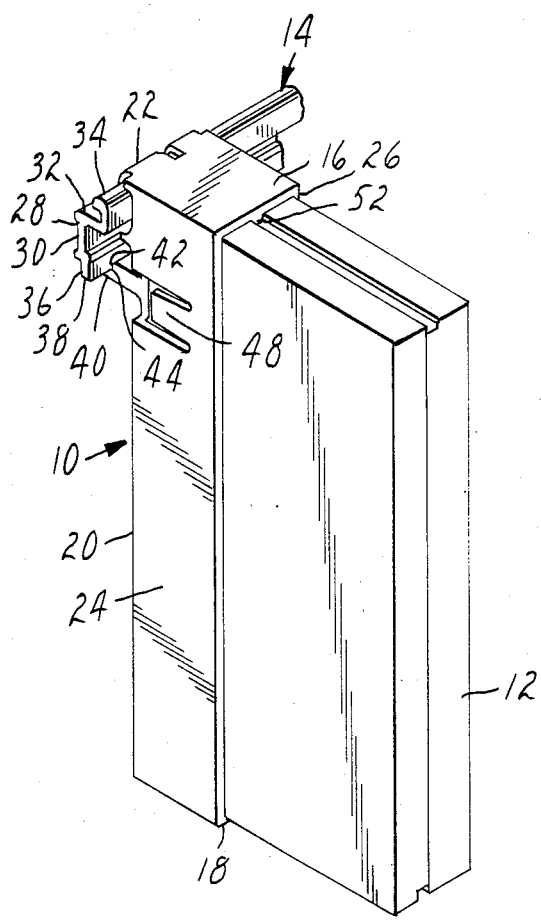
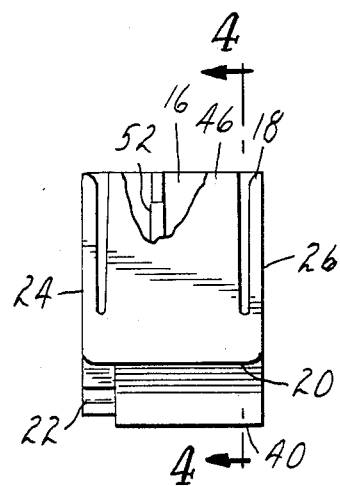
Fig. 1
Fig. 3

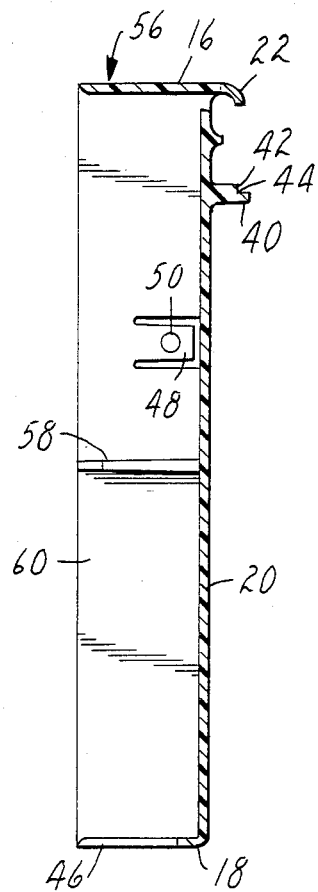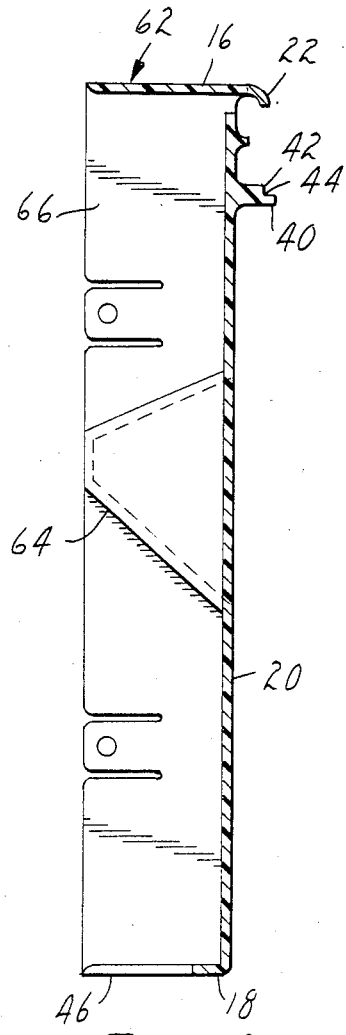

HANGING HOLDER FOR TAPE CASSETTE

BACKGROUND OF THE INVENTION

1. Field of the Invention

The present invention relates to cassettes enclosing a magnetic recording tape and, particularly, a hanging holder which facilitates storage of video tape cassettes.

2. Description of the Prior Art

Video tape cassettes, or videocassettes, may be conveniently stored by suspending a series of videocassettes in side-by-side relationship from a rail attached to a support wall in proximity to the area of use. This method of storage is particularly advantageous in the broadcast industry where, for example, video-taped commercials must be quickly and repeatedly removed from and returned to storage.

U.S. Pat. No. 4,177,896 discloses a storage box for a videocassette which may be hung from a channel mounted on a wall. In this manner, a number of videocassettes may be hung in proximity to the place of use. Such a system is particularly useful when videocassettes are to be stored for a relatively long period of time, but has some shortcomings when applied to short term storage. Drawbacks associated with the system of U.S. Pat. No. 4,177,896, when used in the broadcast industry as described above, are that the storage box may be accidentally disengaged from the support channel, the box is not supported at a convenient angle for access, the box may freely rotate around the support channel, and the box must be manipulated and opened to gain access to the videocassette itself.

Some of these drawbacks were addressed by U.S. Pat. No. 4,194,636 which disclosed a bracket which permitted the videocassette to be hung directly from the support channel, and thus eliminated the intervening storage box of U.S. Pat.No. 4,177,896.

This solution provided quicker access to the videocassette but exposed the videocassette to damage or contamination. Elimination of the protective box may result in damage to the videocassette by contact with the support bracket and the videocassette is exposed to airborne contamination such as dirt and smoke.

SUMMARY OF THE INVENTION

The present invention overcomes the shortcomings of the prior storage systems in that a compromise is struck between a system which provides a storage box completely enclosing the videocassette and a bracket which directly engages the videocassette. The present invention provides an closed-ended sleeve which hangs from a support channel and into which the videocassette may be inserted. Thus the videocassette is partially enclosed and protected from contaminants, and the videocassette does not come into direct contact with the channel. At the same time, the videocassette may be grasped and removed directly from the hanging holder, without removing the holder from its support channel.

In its most basic form, the hanging holder includes a U-shaped frame which includes two spaced end walls for engaging the videocassette and an edge wall which connects the two end walls for support. A hook is attached to the edge wall preferably adjacent one of the end walls and allows the holder to be hung from a support channel. Such a system allows the hanging holder to remain suspended from the support channel while the videocassette is in use. For storage, the videocassette is simply slid between the two end walls and retained by the hanging holder.

Preferably, the hanging holder also includes two side walls which connect the end walls and the edge wall to form a closed sleeve which more fully encloses and protects the videocassette. The hanging holder preferably encloses approximately one-fourth to one-half of the videocassette to provide adequate protection while permitting the videocassette to be easily grasped and removed.

The hanging holder may also include a spring-biased detent for positively retaining the videocassette within the holder, a projection within the holder for engaging a recess in the videocassette and ensuring that the videocassette is always properly oriented with respect to the holder, and a flexible lower end wall opposite the hook which allows the videocassette to be rotated downwardly and thus facilitates removal of the videocassette from the holder.

BRIEF DESCRIPTION OF THE DRAWING

The present invention will be more thoroughly described with reference to the accompanying drawing, wherein like numbers refer to like parts in the several views, and wherein:

FIG. 1 is a perspective view of a hanging holder and a support channel according to the present invention, with a typical videocassette inserted into the hanging holder;

FIG. 3 is a bottom plan view of the hanging holder of FIG. 1;

FIG. 5 is a cross-sectional view similar to FIG. 4 which illustrates an alternate embodiment of the hanging holder;

FIG. 6 is a cross-sectional view similar to FIG. 4 of a second alternate embodiment of the hanging holder.

DESCRIPTION OF THE PREFERRED EMBODIMENTS

FIG. 1 illustrates a hanging holder, generally indicated as 10, which partially encloses and supports a videocassette 12 and is suspended from a support channel 14 horizontally attached to a wall (not shown). The videocassette 12 may be any of the Beta, VHS, VHS-C, U-Matic, Mini U-Matic, ¼ inch or 8 mm cassettes commonly in use, and, in fact, may be any generally-rectangular object for which hanging storage is desirable, such as Phillips format audiocassettes.

Figure 2:
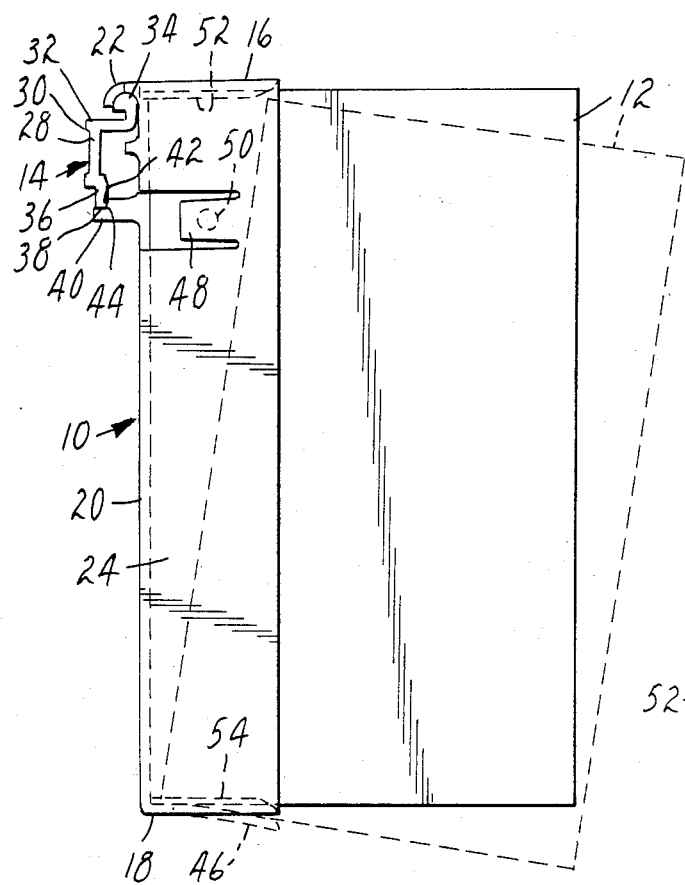
FIG. 2 is a side elevational view of the hanging holder, support rail and videocassette of FIG. 1.

With particular reference to FIG. 2, the hanging holder 10 includes two parallel, spaced end walls 16 and 18 which are connected by a vertical edge wall 20 to form a U-shaped configuration. The preferred material for the holder 10 is a polymer and the preferred method of manufacture is molding. Other materials and/or methods of manufacture could, of course, be utilized The holder 10 further includes an integrally-molded hook 22 which extends from the edge wall 20 opposite the end walls 16 and 18 and which is preferably located adjacent the upper end wall 16. The hook 22, however, may be located anywhere along the edge wall 20, so long as sufficient stability is imparted to the hanging holder 10, and the edge wall 20 may be provided with more than one hook 22 which may engage appropriately mounted support channels 14 for additional stability of the hanging holder 10.

Figure 4:
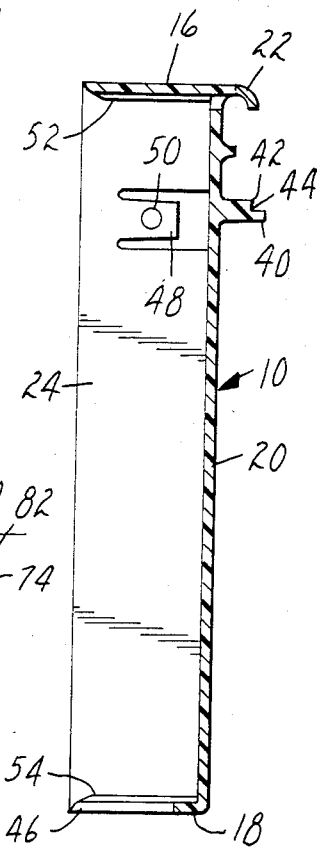
FIG. 4 is a cross-sectional view of the hanging holder taken generally along the line 4—4 of FIG. 3 and rotated 90°.

As shown particularly in FIGS. 3 and 4, the hanging holder 10 is preferably furnished with side walls 24 and 26 which connect the end walls 16 and 18 to the edge wall 20. The side walls 24 and 26 more fully enclose the videocassette 12 for protection and provide strength and rigidity to the end walls 16 and 18 and the edge wall 20. It should be recognized that while the side walls 24 and 26 are desirable, one or both could be eliminated and the videocassette 12 captured and supported by the end walls 16 and 18.

Returning to FIGS. 1 and 2, the support channel 14 includes a back portion 28 having a contact surface 30 which is flat and adapted to be secured to a support such as a building wall or cabinet as by an adhesive or mechanical fasteners. Projecting from the back portion 28 is a hanger portion 32 which terminates in an upstanding lip 34 projecting generally parallel to the contact surface 30. By projecting the hanger portion 32 outward from the contact surface 30, the hook 22 is permitted to overhang and fully engage the lip 34. Extending from the lower end of the back portion 28 is a curved strike portion 36 which terminates in a horizontal lower edge 38. This horizontal lower edge 38 of the support channel 14 is provided to engage a rib 40 which extends from the holder 10 in the same direction as the hook 22.

The rib 40 projects horizontally from the holder edge wall 20 and is provided to support the hanging holder 10 at a particular angle relative to the support channel 14. As shown in FIG. 2, the rib 40 preferably includes a step 42 which produces a 90° corner 44. This corner 44 engages the lower edge 38 of the support channel 14 and provides two functions. First, the length of the step 42 from the edge wall 20 determines the angle at which the hanging holder 10 will be suspended from the lip 34 of the channel 14. Second, the spacing between the rib 40 and the hook 22 is such that the corner abuts the lower edge 38 of the support channel 14 and prevents the hook from lifting off the lip 34 so long as the corner 44 of the rib 40 is in contact with the support channel 14. Thus the hanging holder 10 is protected from accidentally being disengaged from the support channel 14.

To disengage the hanging holder 10 it is necessary to first rotate the holder 10 in a counterclockwise direction, with respect to FIG. 2, to disengage the corner 44 from the lower edge 38 of the support channel 14 and then lift the hanging holder 10 to disengage the hook 22 from the projecting lip 34. In addition to preventing the hook from being removed vertically from the lip 34, the corner 44 also prevents the hanging holder from being rotated sideways, or twisted, so that half of the hook 22 is lifted from the projecting lip 34. It will be noted, however, that while twisting and lifting of the hanging holder 10 is prevented, the holder 10 may be freely slid along the length of the support channel 14 while the corner 44 is in contact with the lower edge 38 of the support channel 14.

While the rib 40 is preferably provided with the corner 44 to capture the support channel 14 between the rib 40 and the hook 22, it should be recognized that the hanging angle of the holder 10 could be determined by a rib 40 which extended from anywhere along the edge wall 20 to contact the support wall for the channel 14, if it was not considered necessary to restrict lifting and twisting of the hanging holder 10.

To facilitate removal of the videocassette 12 from the hanging holder 10, the lower end wall 18 of the holder 10 is provided with a "live hinge", as is best seen in FIGS. 2 and 3. The hinge 46 is integrally molded as a portion of the lower end wall 18 and is formed by removing material of the lower end wall 18 which contacts the side walls 24 and 26. By removing this material, the natural resiliency of the material forming the lower end wall 18 allows the hinge 46 to flex downwardly under pressure. As shown by phantom lines in FIG. 2, movement of the hinge 46 allows the cassette 12 to be removed from the holder 10 by downward, clockwise rotation. Thus the cassette 12 may be easily removed from the holder 10 by grasping and pulling downward on the cassette 12, rather than pulling the cassette 12 straight out of the holder 10. This downward movement and rotation of the cassette 12 causes the rib corner 44 to bear strongly against the support channel 44 and ensures that the hanging holder 10 will remain firmly attached to the support channel 14.

After removal or insertion and release of the videocassette 12, the live hinge 46 returns to its planar condition by virtue of its natural resiliency and retains the videocassette 12 within the holder 10. The force with which the hinge 46 pushed upwardly on the videocassette 12 can be adjusted by varying the thickness of the lower end wall 18 and by varying the length of the separating voids between the lower end wall 18 and the side walls 24 and 26. The material voids may extend completely between the lower end wall 18 and the side walls 24 and 26, in which case the lower end wall 18 would be attached only to the edge wall 20, and flexibility of the hinge 46 would be a maximum, whereas the upward biasing force generated by the hinge 46 would be a minimum. It is preferred that approximately two-thirds of the length of the lower end wall 18 be separated from the side walls 24 and 26, as is illustrated in FIGS. 2 and 3.

FIG. 4 illustrates a further preferred method of retaining the videocassette 12 within the hanging holder 10. One of the side walls 24 or 26 is provided with a flexible tab 48 upon which is molded a spherical protrusion or detent 50. The flexible tab 48 is molded integrally with the side wall 24 or 26 and is produced by coring around most of the perimeter of the tab 48 to produce a void between the tab 48 and the wall 24 or 26 around approximately three-fourths of the perimeter of the tab 48. The tab 48 is thus free to bend where it meets the side wall 24 or 26 and the resiliency of the material produces a biasing force which tends to maintain the tab 48 coplanar with the side wall 24 or 26. The detent 50, molded on the inner surface of the flexible tab 48, protrudes inwardly toward the videocassette 12 and frictionally interfers with the videocassette 12 as the videocassette 12 is inserted into the holder 10. This interference between the detent 50 and the videocassette 12 forces the detent 50 outwardly and generates a biasing force in the flexible tab 48 which presses the detent 50 against the videocassette 12. Thus a frictional force is generated between the detent 50 and the videocassette 12 which tends to resist movement of the videocassette 12 within the hanging holder 10. The force generated between the detent 50 and the videocassette 12 may be increased by providing the videocassette 12 with a recess which accepts the detent 50. In this manner a mechanical locking force will be generated between the detent 50 and the recess in the videocassette 12 which will augment frictional retention. Like the live hinge 46, the biasing force produced by the flexible tab 48 may be varied by adjusting the length of the tab 48. The flexible tab 48 and spherical detent 50 may be located anywhere in the side walls 24 or 26, but preferably are located toward the top of the side walls 24 and 26 to more efficiently resist downward rotation of the videocassette 12. The flexible tab 48 and detent 50 could most advantageously be located in the upper end wall 16, but for aesthetic reasons are preferably located in the side wall 24 or 26. If the videocassette 12 is particularly large and heavy, more than one flexible tab 48 and detent 50 may be formed in one of the side walls 24 or 26 or flexible tabs 48 and spherical detents 50 may be located in each of the side walls 24 and 26.

FIGS. 1 and 4 illustrate a hanging holder which is adapted to be used with a Beta-type videocassette 12. A Beta-type videocassette 12 includes longitudinal recesses, or grooves, in each of its end surfaces. These grooves are asymmetrical with respect to the Beta videocassette 12 in that one of the grooves is centered on the end surface while the opposite groove is off-center. This grooved feature of a Beta videocassette 12 can be used to advantage to permit insertion of the videocassette 12 into the holder 10 at only a particular orientation. As shown in FIG. 4, the hanging holder 10 is provided with mating ribs 52 and 54 which correspond to the grooves formed in the Beta-type videocassette 12. Since the ribs 52 and 54 project inwardly from the holder end walls 16 and 18, the videocassette 12 can only be inserted if the ribs 52 and 54 match the groove formed in the videocassette 12. Since the ribs 52 and 54 and the grooves in the videocassette 12 are not symmetrical with respect to the center line of the holder 10 and the videocassette 12, the videocassette 12 can only be inserted in the holder 10 in an orientation which causes alignment between the videocassette grooves and the ribs 52 and 54. Opposite orientation of the videocassette 12 will cause interference between the ribs 52 and 54 and the videocassette 12 and will prevent insertion of the videocassette 12 into the holder 10.

FIG. 5 illustrates a similar orientation system which is used with VHS format videocassettes. VHS videocassettes are manufactured with a recess on their lower surfaces, which recess is not duplicated in the upper surface of the videocassette. To control the orientation of a VHS videocassette, the hanging holder 56 of FIG. 5 is provided with a rib 58 which projects inwardly from only one of the side walls 60. Thus, a VHS videocassette can be inserted into the holder 56 of FIG. 5 only in a position wherein its grooved underside is located adjacent the side wall 60 and inwardly-projecting rib 58.

FIG. 6 illustrates a hanging holder 62 which is used in conjunction with U-Matic type videocassettes. These U-Matic videocassettes are similar to VHS videocassettes in that a recess is located on the bottom surface which is not reproduced on the upper surface. In U-Matic videocassettes, this recess takes the form of a "V" which is wider toward the front surface of the videocassette. To control orientation of the U-Matic videocassette, the holder 62 is provided with a V-shaped protrusion 64 which is formed on one side wall 66 which matches the recess in the U-Matic type videocassette. Opposite orientation of the videocassette within the holder 62 is prevented because the upper flat surface of a U-Matic videocassette would interfer with the protrusion 64.

From the discussion with respect to FIGS. 4-6, it should be apparent that the protrusion provided on the inner surface of the hanging holder can be adapted to whatever videocassette is intended to be supported by the holder. For that matter, the orientation of any object which may advantageously be stored in such a hanging holder may be controlled by simply providing an asymmetrical recess in the object and a matching protrusion on the inner surface of the holder.

Figure 7:
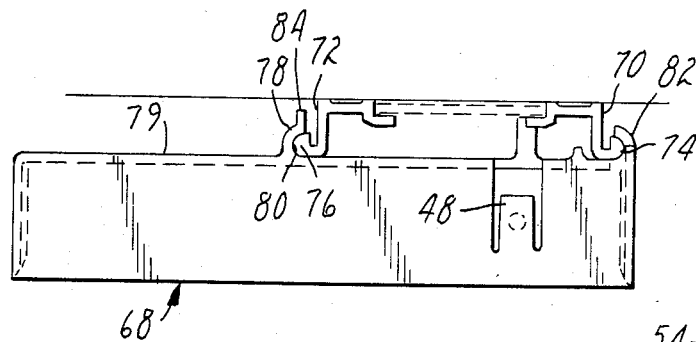
FIG. 7 is a side elevational view of a third alternate embodiment of the hanging holder.

FIG. 7 illustrates a method by which a hanging holder 68 may be supported horizontally rather than vertically as shown in FIGS. 1-6. Horizontal hanging of the videocassette 12 may be desirable to allow label information to be more easily read.

The holder 68 of FIG. 7 is supported by two support channels 70 and 72 which are identical to the support channel 14 of FIGS. 1-6. The channels 70 and 72, however, are mounted vertically on the support wall rather than horizontally and are mounted in back-to-back relationship so that their projecting lips 74 and 76 extend in opposite directions and away from each other. The two channels 70 and 72 could be replaced, however, by a single channel having two projecting lips, as shown by phantom lines.

The holder 68 is provided with a clip 78 which may extend partially or completely across the edge wall 79 and which includes a hook 80 similar to a hook 82 positioned as the hook 22 of FIGS. 1-6. The lip 78 additionally includes a strike 84 which facilitates insertion of the channel 72 into the clip 78. The strike 84 may be straight as illustrated or may be angled or curved away from the hook 82 to further facilitate insertion.

The holder 68 is attached to the channels 70 and 72 by first placing the hook 82 over the lip 74 and rotating the holder until the clip 78 contacts the channel lip 76 and is forced outward by the strike 84 until the hook 80 engages the lip 76.

There has thus been described a hanging holder which is supported by a channel mounted on a vertical surface which is adapted to support a rectangular object inserted therein. The holder supports the object at a particular angle with respect to the vertical attachment surface and includes a live hinge for facilitating removal of the object, a flexible detent for retaining the object within the holder, and a projection which controls the orientation of the object supported. The hanging holder provides physical protection for the object inserted and allows the object to be easily removed and reinserted.

Although the present invention has been described with respect to only a limited number of embodiments, it is recognized that many modifications will be apparent to those skilled in the art. For example, the hook 22 of the holders of FIGS. 1-6 could be repositioned at 90° with respect to the position illustrated so that the hanging holder 10 hangs in a horizontal orientation with respect to the support channel 14 in a manner similar to the holder 68 of FIG. 7. In such a situation, the hook 22 could extend the entire length of the edge wall 20 or could be a number of discrete hooks positioned along the length of the edge wall 20. All such modifications which fall within the spirit and scope of the appended claims are intended to be included within the present invention.

I claim:

1. A hanging holder adapted to accept a generally rectangular, box-shaped object inserted therein in combination with an elongate channel for supporting said hanging holder, wherein said hanging holder comprises:

a U-shaped frame including a rectangular edge wall and two parallel end walls extending from said edge wall and spaced to accept a said object therebetween; and at least one hook extending from said edge wall opposite said end walls; wherein said channel comprises:

a back portion having a contact surface; and a hanger portion projecting from said back portion opposite said contact surface and terminating in a lip projecting generally parallel to said contact surface;

said hanger portion and said lip being sized so that, with said contact surface attached to a vertical surface, said channel horizontal, and said lip projecting upwardly, said at least one hook extending from said hanging holder may be engaged over said lip to hang said holder; and said hanging holder further comprises:

a rib extending from said edge wall in the same direction as said hook to contact said vertical surface when said hook engages said channel lip and cause said holder to hang from said lip at a predetermined angle, said rib being spaced from said hook so as to capture said channel therebetween so that said rib contacts said channel if said holder is moved upwardly and thereby prevents removal of said hook from said lip.

2. A hanging holder according to claim 1 further including a side wall connecting said end walls and said edge wall so that said end walls, said edge wall and said side wall partially enclose a said object.

3. A hanging holder according to claim 2 further including a detent extending inwardly toward a said object from said holder and means biasing said detent into engagement with a said object.

4. A hanging holder according to claim 3 wherein said means biasing said detent comprises a flexible tab equal in thickness and coplanar with said side wall, which tab is attached to said side wall at only a portion of its perimeter 5. A hanging holder according to claim 1 further including two side walls each connecting said end walls and said edge wall to form a closed sleeve surrounding a said object.

6. A hanging holder according to claim 5 wherein said hook is adjacent one of said end walls and wherein the other of said end walls is separated from said side walls for at least a portion of the length of said other end wall to provide a resilient hinge which allows a said object to be rotated downwardly in a direction from said hook toward said hinge to facilitate removal of a said object from said holder.

7. A hanging holder according to claim 6 wherein said sleeve surrounds about one-quarter to one-half of a said object and said other end wall is connected to said side walls for none to about one-half of the length of said end wall.

8. A hanging holder according to claim 1 wherein said elongate channel further includes a lower edge spaced from said contact surface and below said hook, and said holder further includes a rib extending from said edge wall in the same direction as said hook to engage said channel lower edge when said hook engages said lip to prevent lifting of said hook relative to said lip.

9. A hanging holder according to claim 8 wherein said rib is stepped to provide a corner which engages said channel lower edge to vertically orient said holder with respect to said vertical surface and prevent lifting of said hook.

* * * * *